(12) United States Patent
Christensen et al.

(10) Patent No.: US 9,679,073 B2
(45) Date of Patent: Jun. 13, 2017

(54) WEBPAGE COMPRISING A RULES ENGINE

(71) Applicant: Sitecore A/S, Copenhagen (DK)

(72) Inventors: Jakob Hjort Christensen, Kastrup (DK); Michael Seifert, Copenhagen (DK)

(73) Assignee: SITECORE A/S, Kobenhvn V (DK)

( * ) Notice: Subject to any disclaimer, the term of this patent is extended or adjusted under 35 U.S.C. 154(b) by 403 days.

(21) Appl. No.: 14/306,492

(22) Filed: Jun. 17, 2014

(65) Prior Publication Data
US 2015/0012473 A1 Jan. 8, 2015

Related U.S. Application Data

(60) Provisional application No. 61/843,159, filed on Jul. 5, 2013.

(51) Int. Cl.
G06F 17/00 (2006.01)
G06N 5/02 (2006.01)
G06F 17/30 (2006.01)

(52) U.S. Cl.
CPC .............................. G06F 17/3089 (2013.01)

(58) Field of Classification Search
None
See application file for complete search history.

(56) References Cited

U.S. PATENT DOCUMENTS

| | | | | |
|---|---|---|---|---|
| 7,349,890 | B1* | 3/2008 | Pathak | G06F 17/30011 705/64 |
| 7,499,948 | B2* | 3/2009 | Smith | G06Q 30/02 |
| 2002/0091736 | A1* | 7/2002 | Wall | G06F 17/3089 715/234 |
| 2003/0121004 | A1* | 6/2003 | Christensen | G06F 17/243 715/236 |
| 2010/0077321 | A1* | 3/2010 | Shen | G06F 17/30905 715/760 |
| 2010/0174974 | A1* | 7/2010 | Brisebois | G06F 17/243 715/223 |
| 2010/0299586 | A1* | 11/2010 | Yoo | G06F 17/212 715/207 |
| 2012/0151325 | A1* | 6/2012 | Steelberg | G06Q 30/0241 715/234 |
| 2012/0221933 | A1* | 8/2012 | Heiney | G06F 17/30011 715/212 |
| 2014/0068413 | A1* | 3/2014 | Christensen | G06F 8/34 715/234 |
| 2014/0181788 | A1* | 6/2014 | Sullivan | G06F 9/4443 717/109 |
| 2015/0012473 | A1* | 1/2015 | Christensen | G06F 17/3089 706/47 |
| 2015/0366293 | A1* | 12/2015 | Clarkson | A43B 23/0205 703/1 |

* cited by examiner

*Primary Examiner* — Paulinho E Smith
(74) *Attorney, Agent, or Firm* — Birch, Stewart, Kolasch & Birch, LLP

(57) ABSTRACT

A webpage comprising at least one rule rendering element including definition of a rule trigger is provided to a client. When a rule trigger is detected, the rule definitions are analyzed by means of a rules engine, including evaluation of the rule definitions. At least the evaluation takes place client-side. The client performs one or more operations within the webpage on the basis of the evaluation.

12 Claims, 5 Drawing Sheets

WEBPAGE COMPRISING A RULES ENGINE

FIELD OF THE INVENTION

The present invention relates to a method for generating or updating a webpage, the webpage comprising at least one rule rendering element.

BACKGROUND OF THE INVENTION

When providing websites to visitors it is sometimes desirable to be able to update elements of a webpage of the website 'on the fly' while a visitor is visiting the website, e.g. in response to actions and/or navigations performed by the visitor during the visit. For instance, it may be desirable to adapt the content presented to the visitor or the visual presentation to the visitor to the device which the visitor uses for accessing the website. In the case that the device is a cell phone or a tablet, it may further be desirable to adapt the presented content or the visual presentation, depending on the orientation of the device, in which case it may be desirable to change, e.g., the visual presentation if the visitor changes the orientation of the device. Furthermore, it may be desirable to adapt non-visual elements, such as data collection services, to characteristics of the visitor and/or characteristics of the visitor's behaviour on the website.

U.S. Pat. No. 7,349,890 discloses a system and method for dynamically applying content management rules, where a rule is associated with a rule condition. Based on the state of the rule condition, it is determined if the rule is applicable, and a user interaction is received, based on a set of content, e.g. web site content. If the rule is determined to be applicable, the rule is applied to the user interaction. All of this takes place server-side.

U.S. Pat. No. 7,499,948 discloses a system and method for web-based personalization and e-commerce management. The personalization system uses rules to adjudicate and characterize a customer, or a customer's action, and then personalizes a business function, such as a displayed page, based on the outcome of those rules. The method takes place server-side.

DESCRIPTION OF THE INVENTION

It is an object of embodiments of the invention to provide a method for performing an operation within a webpage, the method allowing changes to the webpage in response to rule triggers occurring during visits to the webpage.

The invention provides a method for performing operations within a webpage, the webpage residing on a server and being presented on a client, the method comprising the steps of:

providing a main layout, said main layout at least substantially covering the webpage,
  providing at least one rendering element within the main layout, each rendering element being adapted to perform a function and/or an action, and at least one of the rendering element(s) being a rule rendering element, each rule rendering element including definitions of a rule relating to one or more functions and/or one or more actions of the webpage, including definition of a rule trigger,
  providing a rules engine comprising sets of conditions and actions relating to each of the rule rendering element(s),
  upon request from a client, providing the webpage, including the rendering element(s), from the server to the client,
  in the case that a rule trigger relating to at least one rule rendering element is detected, analysing the rule definitions of said rule rendering element, by means of the rules engine, and on the basis of the rule trigger and conditions defined in the rules engine, said analysis including evaluation of rule definitions of the rule rendering element, at least said evaluation taking place client-side, and
  the client performing one or more operations within the webpage on the basis of said evaluation.

The present invention relates to a method for performing one or more operations within a webpage. The operation(s) being performed may relate to content being presented to a visitor, via the client, such as selection of a specific ad, adding or removing content and/or ads, selection of position of content and/or ads, etc. As an alternative, the operation(s) being performed may relate to non-visual aspects of the webpage, such as sending a server request, changing an internal state in the client, logging of visitor behaviour, etc.

The webpage may form part of a website. In the present context the term 'website' should be interpreted to mean a collection of related webpages, images, videos or other digital assets being addressed relative to a common Uniform Resource Locator (URL). The webpages of the website may advantageously be designed, presented and linked together to form a logical information resource and/or transaction initiation function.

According to the invention, the webpage is residing on, or hosted on, a server. The server, and thereby the webpage, is typically accessible via a data network, such as the Internet or a Local Area Network (LAN). It should be noted that, in the present context, the term 'server' should be interpreted to cover a single device as well as two or more individual devices being interlinked in such a manner that they, to a visitor of the webpage, seem to act as a single device.

The webpage is presented on a client. In the present context the term 'client' should be interpreted to mean a device which is operable by a visitor of the webpage in order to allow the visitor to access the webpage, via a suitable data network. Thus, the client may be a personal computer (PC), e.g. in the form of a stationary PC or a laptop, a tablet, a cell phone, a television, or any other suitable kind of device which allows a visitor to access the webpage.

According to the method of the invention, a main layout is initially provided, which at least substantially covers the webpage. Thus, the main layout substantially defines the overall structure of the webpage, including how various elements of the webpage are arranged relative to each other.

Next, at least one rendering element is provided within the main layout. In the present context the term 'rendering element' should be interpreted to mean an element of a webpage, which is adapted to perform a function and/or an action at the webpage. A function performed by a rendering element could, e.g., be generating an output to be presented at the webpage, e.g. a visible output, such as the visual appearance of the rendering element, or an audible output. An action performed by a rendering element could, e.g., be updating other rendering elements, e.g. text or visual cues of other rendering elements, performing a request to the server and processing it, navigating to another URL, etc.

At least one of the rendering element(s) is a rule rendering element. In the present context the term 'rule rendering element' should be interpreted to mean a rendering element which includes definitions of a rule relating to one or more functions and/or one or more actions of the webpage. In the present context the term 'rule' should be interpreted to mean something which specifies certain actions to be performed when certain conditions are fulfilled.

A rule trigger defines when conditions relating to a given rule must be checked in order to determine which actions to perform. The rule trigger may, e.g., specify a specific event, and when the specific event occurs, conditions relating to the rule are checked, and an action may be performed in accordance with the conditions. The rule trigger could, e.g., be or relate to an action performed by a visitor during a visit. As an alternative, the rule trigger could be system initiated, e.g. in the form of a time out. The rule trigger may advantageously include a change in an internal state on the client, in which case the change may be user initiated and/or system initiated.

One of the definitions included in the rule rendering element(s) is a definition of a rule trigger. Accordingly, each rule rendering element includes a definition of when conditions of the rule related to the rule rendering element must be checked.

Furthermore, a rules engine is provided. The rules engine comprises sets of conditions and actions relating to each of the rule rendering element(s). The rules engine may, e.g., specify a number of matching or inter-related conditions and actions, in the sense that the rules engine defines that when a given condition is fulfilled, then an action matching the condition must be fulfilled. The rules engine may, e.g., be in the form of a table specifying the mutual relationship between a number of conditions and a number of actions relating to a given rule.

Actions relating to a rule rendering element could, e.g., be removing content from the webpage, adding content to the webpage, moving content within the webpage, sending a request to the server, setting or changing an internal state in the client, initiating data logging, etc. Conditions relating to a rule rendering element could, e.g., be a size of a window displaying the webpage at the client, type of the client device, orientation of the client device, region or country where the visitor is located, settings relating to a profile of the visitor, etc.

The rules, including the rule triggers, may be predefined in the sense that they are set initially, e.g. by an administrator of the webpage. As an alternative, the rules defined in the rules engine and/or the rule triggers may be adjusted, deleted or added 'on the fly', e.g. via the rules engine, thereby providing a very dynamic system.

Upon request from a client, the webpage is provided from the server to the client. Thus, when a visitor wishes to access the webpage, he or she contacts the server having the webpage residing thereon, via the client and a suitable data network, thereby requesting the webpage. In response thereto, the server provides the webpage to the client. The webpage being provided to the client includes the rendering element(s) which are provided within the main layout, as described above. Accordingly, the webpage being provided to the client includes at least one rule rendering element. Thereby the rule rendering element(s), including the corresponding rule trigger(s), is/are provided to the client.

Next, it is investigated whether or not a rule trigger relating to at least one rule rendering element is present. If at least one rule trigger is detected, the rule definitions of the corresponding rule rendering element are analysed. This is done by means of the rules engine, and on the basis of the rule trigger and conditions defined in the rules engine. Thus, the detection of the rule trigger causes the corresponding rule to be investigated. To this end, the rules engine is consulted, i.e. the conditions specified in the rules engine, corresponding to the relevant rule, are compared to actual conditions which are present. Based on this comparison, and the link between the conditions and actions being specified in the rules engine, an appropriate action is selected.

Thus, the analysis includes evaluation of rule definitions of the rule rendering element, i.e. actually deciding which action(s) to select. At least the evaluation part of the analysis takes place client-side. This is possible because the definitions of the rule, including the definition of the rule trigger, are provided to the client as part of a rendering element, when the webpage is provided to the client.

Finally, the client performs one or more operations within the webpage, on the basis of the evaluation. Thus, the operation(s) is/are performed client-side. The operation(s) being performed may advantageously include the action(s) being selected during the evaluation, as described above.

It is an advantage that at least the evaluation and the step of performing the operation are performed client-side, because thereby it is possible to dynamically adjust the webpage during a visit, in accordance with trigger and conditions being detected.

One example of an implementation of the method according to the invention could be a rule relating to the size of a window presenting the webpage to the visitor at the client. For instance, in the case that the window becomes too small, it may not be able to accommodate all of the available content in a manner which is possible when the window is larger. Therefore it may be appropriate to remove or move some content when the size of the window becomes smaller than a given threshold value. For instance, it may be decided to leave out an ad, or to move a field containing text.

In the example above, a rule trigger could be that it is detected that the visitor changes the size of the window presenting the webpage. This triggers that the rules engine is consulted with respect to correlated conditions and actions relating to the 'size of window' rule. The rules engine may, e.g., specify that if the size of the window is below a specified first threshold value, then a specified ad should be removed. The rules engine may further specify that if the size of the window is below a specified second threshold value, which is smaller than the first threshold value, then a specified text box should be moved to another location within the webpage. The actual size of the window is then detected and compared to the threshold values specified in the rules engine. Based on this comparison it is determined whether or not the ad should be removed, and whether or not the text box should be moved. Finally, an operation is performed within the webpage, in the form of removing the ad and not moving the text box, removing the ad and moving the text box, or leaving the ad as well as the text box at their original positions, depending on the outcome of the comparison. At least the comparison, i.e. the evaluation of the rule, and the step of performing the operation are performed client-side.

Another example could be a rule relating to communication with a server. The server could, e.g., be the server having the webpage residing thereon, or it could be a third party server, such as a server used for collecting analytics data relating to visits on the webpage and/or on a website to which the webpage belongs. In this case a rule trigger could be that a specified internal state of the client is changed, such as the visitor selecting an option in a drop down list, or a visitor clicking a button twice when only one click was expected. When a change in the specified state is detected, the rules engine is consulted with respect to correlated conditions and actions relating to the rule relating to the specified internal state. The rules engine may, e.g., specify that if the internal state of the client has been changed to a specified value, then logging of the visitor behaviour should be initiated in order to collect analytics data relating to the visitor, and that the collected data should be forwarded to a specified third party server. Furthermore, various values of the specified internal state of the client may indicate various kinds of data to be collected, and/or various third party servers to be contacted. The actual value of the internal state of the client is then investigated and compared to the values specified in the rules engine, thereby evaluating the rule definitions. Finally, the relevant third party server(s) is/are contacted, and relevant logging is initiated, in accordance with the comparison. Also in this example at least the comparison, i.e. the evaluation of the rule definitions, and the step of performing an operation, i.e. initiating server contact and initiating logging, are performed client-side.

It is an advantage that the rule definitions, including the definition of a rule trigger, are provided in the form of a standard rendering element, because thereby it can easily be accommodated in the normal structure of the webpage. Furthermore, the rules may be added, deleted or adjusted without requiring that the person performing these actions possesses programming skills.

The method may further comprise the step of supplying the rules engine to the client along with the webpage and the rendering element(s). According to this embodiment, not only the rule definitions, including the definition of the rule trigger, but also the entire rules engine, including the sets of conditions and actions relating to the rule, is provided to the client along with the webpage. The rules engine may also be provided in the form of a rendering element within the main layout. In this case it may form part of the rule rendering element, or it may be a separate rendering element. According to this embodiment, the entire analysis step may advantageously take place client-side.

Thus, the step of analysing the rule definitions may comprise the steps of:
  based on the rule trigger, the client interpreting the rule definitions of the rule rendering element, based on the conditions defined in the rules engine, and
  the client evaluating the rule definitions of the rule rendering element, based on said interpretation, and based on the actions defined in the rules engine,
and the step of performing one or more operations within the webpage may be performed on the basis of said evaluation.

According to this embodiment, all the information required in order to perform the analysis of the rule definitions of the rule rendering element is available at the client, and therefore the entire analysis can take place client-side, without having to contact the server. Thus, the interpretation of the rule definitions, as well as the evaluation of the rule definitions takes place at the client in this case. This allows the webpage to be quickly and easily adjusted in accordance with the prevailing conditions.

As an alternative, the rules engine may be stored at the server having the webpage residing thereon. This has the advantage that the information communicated to the client following a client request for the webpage can be minimised, and the response times can thereby be minimised.

In this case, the step of analysing the rule definitions may comprise the steps of:
  based on the rule trigger, the client requesting the server to analyse the rule definitions of the rule rendering element, based on the conditions defined in the rules engine,
  the server generating rules code, based on the conditions defined in the rules engine, and returning said rules code to the client, and
  the client evaluating the rule definitions of the rule rendering element, based on the rules code received from the server, and based on the actions defined in the rules engine,
and the step of performing one or more operations within the webpage may be performed on the basis of said evaluation.

According to this embodiment, when a rule trigger is detected, the client contacts the server having the webpage residing thereon in order to initiate the analysis process. Thereby the client requests the server to analyse the rule definitions of the rule rendering element, based on the conditions defined in the rules engine. In response thereto, the server consults the rules engine in order to extract relevant information relating to the rule which has been triggered. Based on this, the server generates rules code and returns the rules code to the client. Thus, the client only receives information which is relevant with respect to the rule which has been triggered, instead of receiving the entire rules engine. This has the advantage that the amount of information communicated from the server to the client can be minimised.

The rules code generated by the server may, e.g., include mutual links between conditions and actions relating to the rule which has been triggered, which are specified in the rules engine. For instance, in the example above relating to the size of the window presenting the webpage to a visitor at the client, the rules code could include information relating to the two threshold values, and the corresponding actions, i.e. removing the ad and moving the text box.

When the client receives the rules code from the server, it evaluates the rule definitions of the rule rendering element, based on the rules code received from the server, and based on the actions defined in the rules engine. Thus, the client identifies the actual conditions prevailing at the client, and compares these to the information received from the server. In the example above, the client detects the actual size of the window, compares this size to the two threshold values received from the server, and determines whether or not the ad should be removed, and whether or not the text box should be moved, based on this comparison.

Finally, the step of performing one or more operations within the webpage is performed, client-side, on the basis of the evaluation. In the example above, the client ensures that the ad is removed and the text box remains in the original position, or that the ad is removed and the text box is moved, or that the ad as well as the text box remains in their original positions, in accordance with what was determined during the previous step.

The rule rendering element(s) may be provided to a browser of the client in the form of JavaScript. This is an advantage, because JavaScript is the native programming language of browsers. Therefore, if rule rendering elements are provided in the form of JavaScript, no interpretation of rule definitions is needed. The rule rendering code is executed as is, thereby ensuring maximum performance. By representing rule rendering elements as JavaScript code, no evaluation engine is needed, thus reducing programming errors, reducing code maintenance, and providing maximum flexibility.

The step of providing a rules engine may comprise defining sets of conditions and actions relating to each rule rendering element. According to this embodiment, the rules engine is 'built', e.g. by an administrator of the webpage, and thereby the rules engine can be customized to fulfil requirements or match desires of the administrator. Thus, an administrator of the webpage may choose which rules to apply on the webpage by defining the sets of conditions and actions of the rules engine. The conditions and actions may each be selected from a limited list of conditions/actions, in which case the step of defining sets of conditions and actions can be performed merely by picking a number of conditions from the list of conditions, and associating each picked condition with an action which is also picked from the list of actions. This is very easy, and can be performed by an administrator without programming skills. As an alternative, the sets of conditions and actions may be defined without restrictions in the sense that an administrator may define any desirable conditions and actions, and associate these to each other in any desired manner, in order to obtain rules which match the exact requirements set by the administrator.

Furthermore, the step of defining sets of conditions and actions may be performed on the fly, in the sense that the sets may be changed or adjusted after the webpage has been programmed, thereby changing or adjusting the rules being applied when a visitor requests the webpage.

The method may further comprise the steps of:
monitoring behaviour, at the client, of a visitor visiting the website,
in the case that behaviour of the visitor constitutes a rule trigger relating to at least one rule rendering element, initiating analysis of the rule definitions of said rule rendering element, and
dynamically performing one or more operations within the webpage, client-side, on the basis of said analysis.

According to this embodiment, the rule trigger relating to at least one rule rendering element is related to behaviour of the visitor during the visit to the webpage. The triggering behaviour may, e.g., include visitor interaction with the webpage, such as a specific mouse click, filling in a form, navigating to a subsequent webpage, entering logon credentials, activating a link, starting or ending a video sequence or an audio sequence, etc. As an alternative, the triggering behaviour may be related to various settings at the client, such as the visitor changing the size of a window presenting the webpage at the client, the visitor changing the orientation of the client device, such as a client device in the form of a tablet or a cell phone, the visitor changing a screen resolution of the client device, etc.

As an alternative, the rule trigger may be initiated by the system, rather than by the behaviour of the visitor. In this case the rule trigger relating to at least one rule rendering element may, e.g., be or include a time out, change of an internal client state, a message from the server, etc.

The steps of analysing and performing one or more operations within the webpage may be performed in real time. This is possible because the evaluation step takes place client-side. Thereby all client states (both internal states and states which are visible to the visitor) are readily available, and do not need to be transmitted to the server. This increases the responsiveness of the webpage, and thereby enhances the visitor experience.

In the following the term 'static webpage' should be interpreted to mean a hardcoded webpage, which is generated when it is designed. A static webpage does not change until a new version of the webpage is compiled, e.g. being published via a CMS. The webpage is, in this case, static at the server. For instance, the same components may always be present on the webpage, and little or no code is running on the server to generate the webpage. One example is an HTML file.

In the following the term 'dynamic webpage' should be interpreted to mean a webpage which is generated on-the-fly when a visitor to the webpage makes a request to the webpage, e.g. an URL request. The webpage is assembled from metadata. The webpage is, in this case, dynamically generated at the server.

In the following the term 'interactive webpage' should be interpreted to mean a webpage which contains interactive parts. A good HTML5 page may allow a visitor to interact with the webpage in the browser. The webpage is, in this case, interactive at the client.

In the following the term 'non-interactive webpage' should be interpreted to mean a webpage with no interactive parts, and which is adapted to present information. A visitor to the webpage will not be able to perform any actions which might lead to an interactive change on the webpage. The webpage is, in this case, non-interactive at the client.

Thus, static/dynamic properties relate to the server side of the system, and interactive/non-interactive properties relate to the client side of the system.

At least one of the rendering elements may define interactive functionality allowing a visitor to the webpage to interact with the webpage, and a rule trigger of at least one rule rendering element may include a predefined interaction performed by a visitor. Thus, according to this embodiment the webpage is an interactive webpage, as opposed to a non-interactive webpage containing no interactive part. The interactive functionality may be activated by a visitor visiting the webpage, the visitor interacting with the webpage, thereby causing changes to the webpage, via the rendering element. The interactive functionality may, e.g., include a tick box, a form which can be filled in, a poll, etc. According to this embodiment, when the visitor activates the interactive functionality of the rendering element, this constitutes a rule trigger, and an analysis process as described above is thereby initiated.

The step of performing one or more operations within the webpage may comprise generating or updating the webpage. According to this embodiment, the webpage is either generated or updated in response to the outcome of the analysis process. An update of the webpage may, e.g., include removing or moving content presented at the client device, as described above. As an alternative, the step of performing one or more operations within the webpage may be of a non-visual kind, such as sending a server request, changing an internal state on the client, initiating a data logging process, etc.

The webpage may be a dynamic webpage, as described above. Dynamic webpages can be changed without requiring time consuming compilation or publishing. This includes the rule rendering elements which can be changed with any programming, compilation or publishing. It is therefore possible for non-technical end-users to change the programming logic on the webpage, simply by adding a new rule rendering element and setting up the rule definitions, using the rules engine.

Below is an example of a source code for conditions and actions in a rules engine which may be used when performing the method according to the invention.

```
Condition code:
define([ ], function ( ) {
    var condition = function (context, args) {
        var control = context.app;
        var parts = args.name.split('.');
        for (var n = 0; n < parts.length; n++) {
            control = control[parts[n]];
            if (control == null) {
                break;
            }
        }
```

-continued

```
        }
        if (control == null) {
            throw "Control '" + name + "' not found";
        }
        var text = control.get("text");
        return text != null && text != "";
    };
    return condition;
});
Action code:
define([ ], function ( ) {
    var action = function (context, args) {
        var control = context.app;
        var parts = args.name.split('.');
        for (var n = 0; n < parts.length; n++) {
            control = control[parts[n]];
            if (control == null) {
                break;
            }
        }
        if (control == null) {
            throw "Control '" + name + "' not found";
        }
        control.set("isVisible", args.value.toLowerCase( ) != "false");
    };
    return action;
});
```

BRIEF DESCRIPTION OF THE DRAWINGS

The invention will now be described in further detail with reference to the accompanying drawings in which.

DETAILED DESCRIPTION OF THE DRAWINGS

Figure 1:
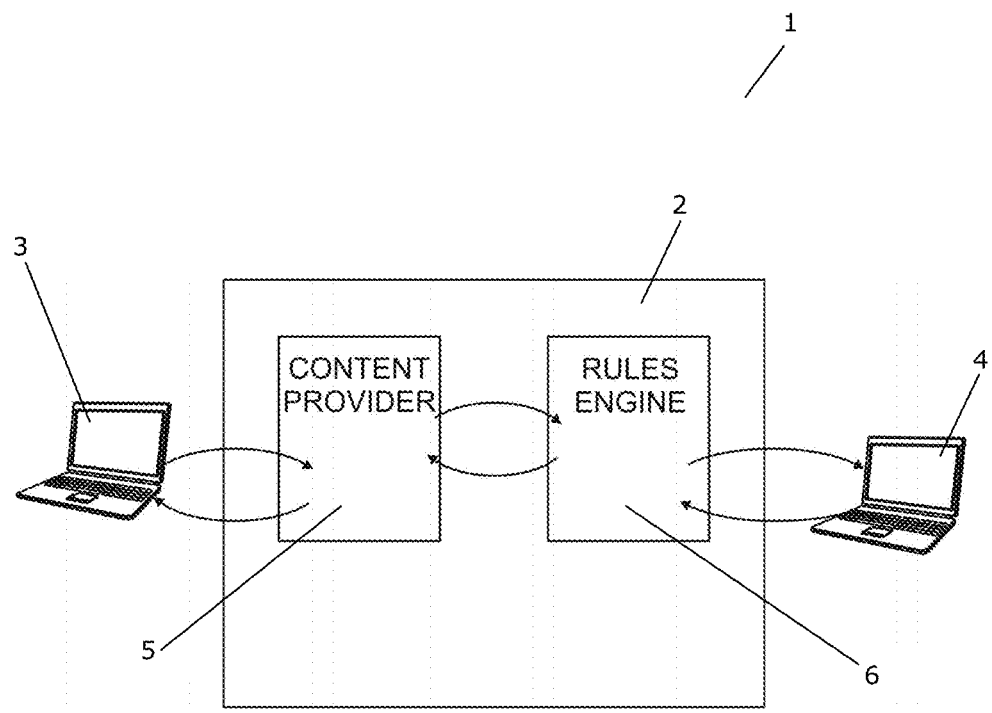
FIG. 1 is a diagrammatic view of a system for performing a method according to an embodiment of the invention.

FIG. 1 is a diagrammatic view of a system 1 for performing a method according to an embodiment of the invention. The system 1 comprises a server 2, a client 3, and an administrator device 4. In FIG. 1 the client 3 and the administrator device 4 are shown as personal computers (PC). It should, however, be noted that the client 3 and/or the administrator device 4 could, alternatively, be any other suitable kind of device, such as a tablet, a cell phone, a television, etc., as long as it allows a visitor or an administrator to access the server 2 via a data network.

The server 2 is illustrated as a single device. It should, however, be noted that the server 2 could, alternatively, comprise two or more separate devices interlinked in such a manner that they act as a single device.

The server 2 has a content provider 5 and a rules engine 6 residing thereon. The content provider 5 is adapted to communicate with a client device 3 in a manner which will be described in further detail below, in order to provide content of a webpage to the client device 3.

The rules engine 6 comprises sets of conditions and actions relating to one or more rule rendering elements forming part of a webpage residing on the server 2. Thus, the rules engine 6 specifies which actions to perform when certain conditions are fulfilled.

The system 1 of FIG. 1 may operate in the following manner. When a visitor wishes to visit a webpage residing on the server 2, he or she accesses the server 2 via the client 3 and a suitable data network, thereby requesting the webpage. Upon receipt of the request, the content provider 5 provides the requested webpage to the client 3, via the data network. The webpage provided to the client 3 in this manner includes a number of rendering elements, and at least one of the rendering elements is a rule rendering element, as described above. Thus, the client 3 receives information relating to definitions of a rule relating to each of the rule rendering element(s), including definition of a rule trigger for each rule rendering element. This makes the client 3 capable of evaluating rule definitions of the rule rendering element(s). This will be described in further detail below.

It is then investigated whether or not one or more rule triggers of the rule rendering element(s) is/are triggered. When a rule trigger relating to a rule rendering element is detected, an analysis process is initiated. The analysis includes consulting the rules engine 6, determining actual conditions prevailing, comparing the actual conditions to the conditions specified in the rules engine 6, and identifying one or more actions which correspond to the actual conditions. Thereby the rule definitions of the rule rendering element associated with the detected rule trigger are evaluated.

According to one embodiment, the rules engine 6, or a copy of the rules engine 6, is provided to the client 3 along with the webpage. In this case, everything which is required in order to perform the analysis described above is available at the client 3. Therefore, in this case, the client 3 directly consults the rules engine 6 and compares actual, detected conditions to the information available in the rules engine 6. Based on this comparison, and on how the conditions and the actions are related in the rules engine 6, the client 3 identifies one or more actions to be performed. Finally, the client 3 performs the identified action(s).

According to another embodiment, the rules engine 6 remains on the server 2, and only rule definitions, including definition of a rule trigger, for each rule rendering element is provided to the client 3 along with the webpage. According to this embodiment, when a rule trigger is detected, and the analysis process is therefore initiated, the client 3 sends a request to the server 2, including information regarding the detected rule trigger. In response to this request, the server 2 consults the rules engine 6 in order to extract relevant information regarding the rule which has been triggered. The server 2 then generates rules code, based on the information extracted from the rules engine 6, and the generated rules code is provided to the client 3, via the content provider 5 and the data network. The client 3 then performs the evaluation of the rule definitions described above, based on the received rules code, and performs the identified action(s), as in the embodiment described above. Thus, according to this embodiment, part of the analysis process takes place at the server 2, and part of the analysis process takes place at the client 3.

In both of the embodiments described above, the steps of evaluating the rule definitions and performing the identified action(s) take place at the client 3. This is an advantage, because this allows the webpage and/or internal state settings of the webpage to be changed or adjusted quickly and easily to match prevailing conditions.

An administrator of the webpage may access the rules engine 6 via the administrator device 4. This allows the administrator to define sets of conditions and actions in the rules engine 6, and thereby to design the rules relating to the rule rendering element(s) of the webpage. Furthermore, the administrator may change or adjust existing sets of conditions and actions in this manner.

Figure 2:
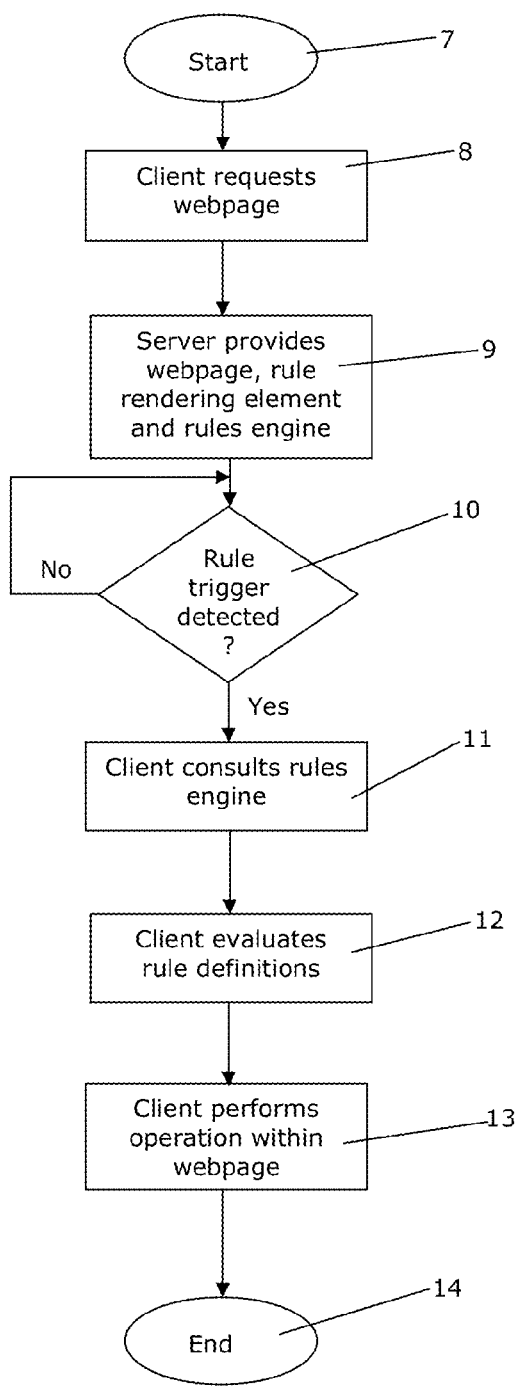
FIG. 2 is a flow diagram illustrating a method according to a first embodiment of the invention.

FIG. 2 is a flow diagram illustrating a method according to a first embodiment of the invention. The process is started at step 7. At step 8 a client requests a webpage from a server. In response thereto the server provides the requested webpage to the client, at step 9. The server provides one or more rule rendering elements, including definitions of rule triggers and possible further rule definitions relating to the rule rendering element(s) along with the webpage. The server further provides a rules engine comprising sets of conditions and actions relating to the rule rendering element(s) to the client.

At step 10 it is investigated whether or not a rule trigger relating to one of the rule rendering element(s) has been detected. If this is not the case, the process is returned to step 10 for continued monitoring for rule triggers.

In the case that a rule trigger is detected at step 10, the process is forwarded to step 11, where the client consults the rules engine, which was provided to the client by the server at step 9. Thereby the client extracts information from the rules engine which is relevant to the rule rendering element which has been triggered.

At step 12 the client evaluates rule definitions relating to the rule rendering element which has been triggered. This includes identifying conditions which are actually occurring, and which relate to the rule rendering element which has been triggered, comparing the actually occurring conditions to the conditions specified in the rules engine, and identifying one or more actions to be performed, based on the comparison and on the mutual links between the conditions and actions defined in the rules engine.

At step 13 the client performs an operation within the webpage, based on the evaluation performed at step 12. Finally, the process is ended at step 14.

Thus, in the embodiment illustrated in FIG. 2, the entire analysis process takes place at the client. This is possible because the rule rendering element(s), including the definitions of the rule triggers, as well as the rules engine is communicated to the client along with the webpage.

In one example of the method described above, the rule rendering element could relate to the size of a window presenting the webpage at the client. In this case the rule trigger could be that the visitor resizes the window at the client. The sets of conditions and actions relating to this rule and specified in the rules engine could, e.g., specify that if the size of the window is below a first threshold value, then a specified ad must be removed from the webpage, and if the size of the window is below a second, smaller, threshold value, then a specified text box must be moved to another location within the webpage. Having consulted the rules engine, the client detects the actual size of the resized window and compares this size to the threshold values specified in the rules engine. Based on this comparison, and on the sets of conditions (i.e. the two threshold values) and actions (i.e. removing the ad and moving the text box, respectively), the client determines whether zero, one or two of the actions described above should be performed. Finally, the client performs the identified action(s), if any.

Figure 3:
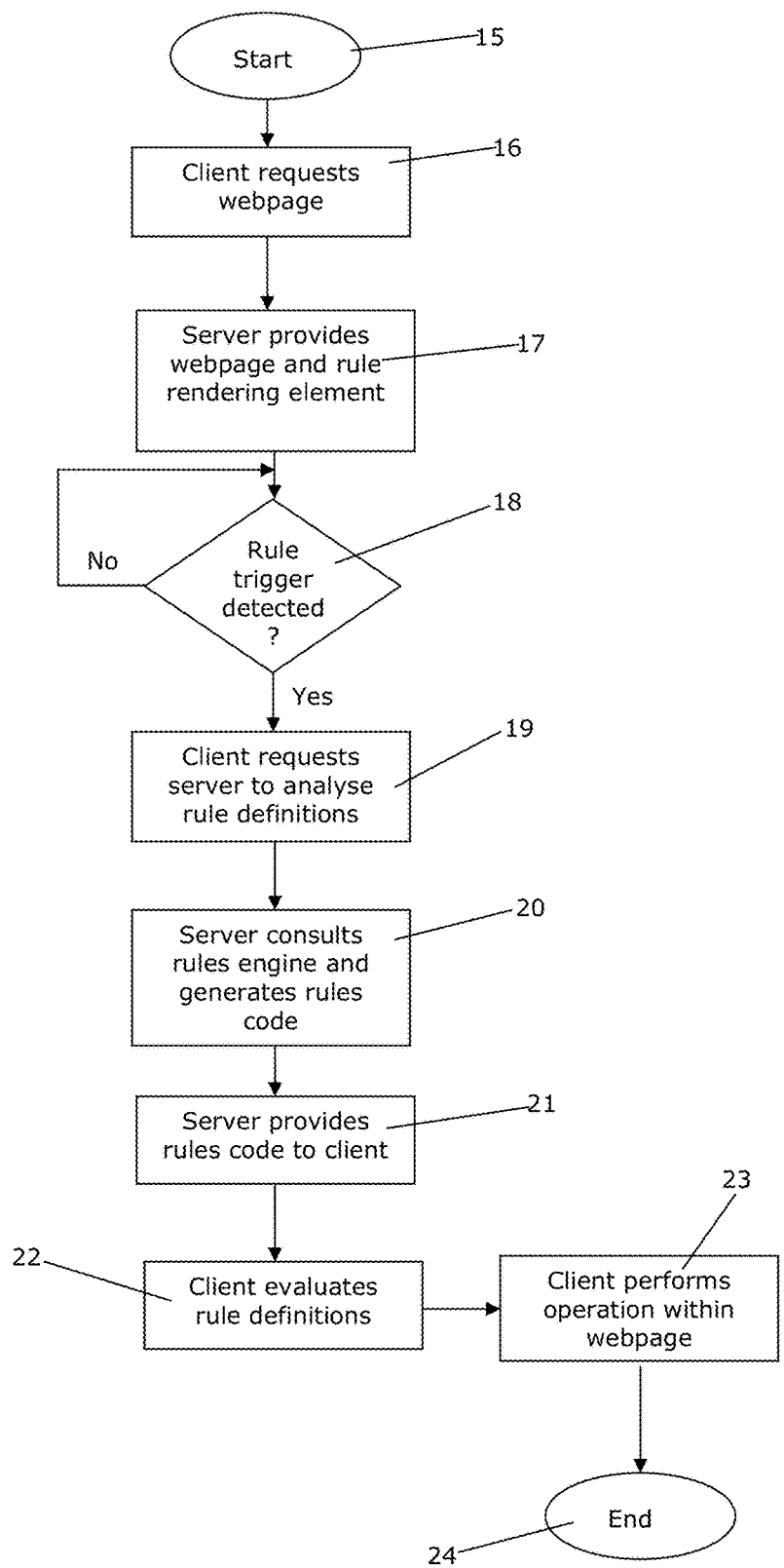
FIG. 3 is a flow diagram illustrating a method according to a second embodiment of the invention.

FIG. 3 is a flow diagram illustrating a method according to a second embodiment of the invention. The process is started at step 15. At step 16 a client requests a webpage from a server. In response thereto the server provides the requested webpage to the client, at step 17. The server provides one or more rule rendering elements, including definitions of rule triggers and possible further rule definitions relating to the rule rendering element(s) along with the webpage. However, contrary to the method described above with reference to FIG. 2, the server does not provide a rules engine to the client. Instead a rules engine comprising sets of conditions and actions relating to the rule rendering element(s) is stored at the server.

At step 18 it is investigated whether or not a rule trigger relating to one of the rule rendering element(s) has been detected. If this is not the case, the process is returned to step 18 for continued monitoring for rule triggers.

In the case that a rule trigger is detected at step 18, the process is forwarded to step 19, where the client requests the server to analyse rule definitions relating to the rule rendering element which was triggered.

At step 20 the server consults the rules engine stored at the server in order to extract information regarding sets of conditions and actions which is relevant to the rule rendering element which has been triggered. Based on the extracted information, the server generates rules code reflecting the extracted information.

At step 21 the server provides the generated rules code to the client. At step 22 the client evaluates rule definitions relating to the rule rendering element which was triggered, based on the rules code received from the server. This includes identifying conditions which are actually occurring, and which relate to the rule rendering element which has been triggered, comparing the actually occurring conditions to the rules code received from the server, and identifying one or more actions to be performed, based on the comparison and on the mutual links between the conditions and actions defined in the rules engine.

At step 23 the client performs an operation within the webpage, based on the evaluation performed at step 22. Finally, the process is ended at step 24.

Thus, in the embodiment illustrated in FIG. 3, the analysis process is performed partly at the server and partly at the client. One advantage of this embodiment is that only information relating to a rule rendering element which has actually been triggered needs to be communicated to the client, rather than the entire rules engine. Thereby the amount of data communicated to the client is minimised, while ensuring that sufficient information is available at the client to allow the evaluation of the rule definitions to take place client-side.

Figure 4:
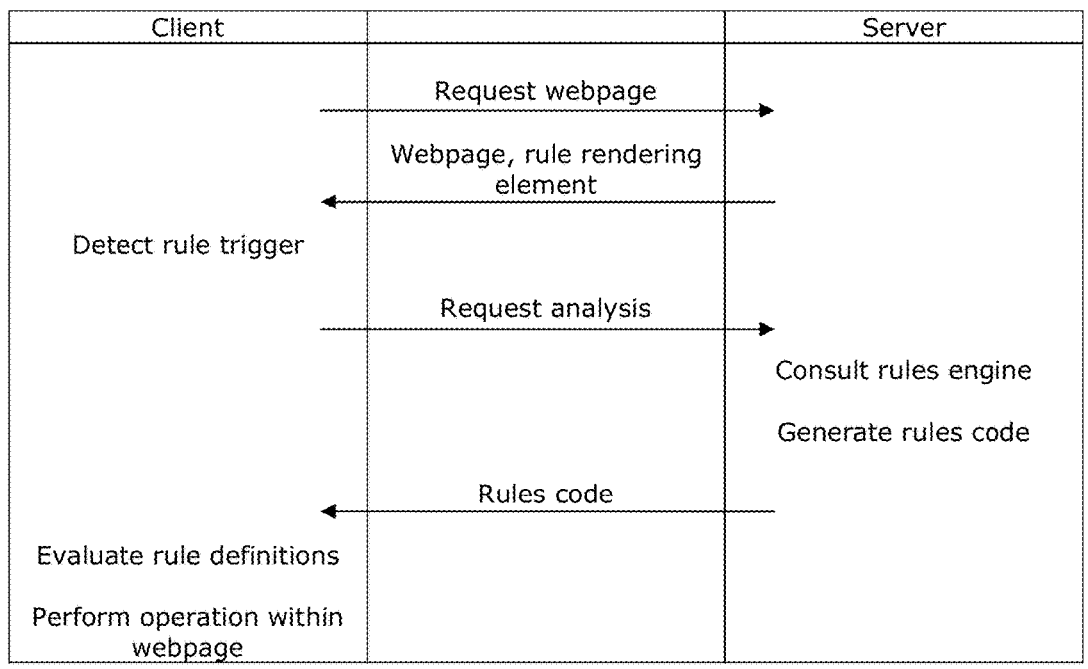
FIG. 4 is a diagram illustrating communication between a client and a server when performing the method illustrated in FIG. 3.

FIG. 4 is a diagram illustrating communication between the client and the server when performing the method illustrated in FIG. 3. Initially a client requests a webpage from a server. In response thereto, the server provides the requested webpage to the client. The webpage comprises one or more rendering elements, at least one of the rendering elements being a rule rendering element. Each rule rendering element includes definitions of a rule, including definition of a rule trigger.

Next a rule trigger is detected at the client. In response thereto the client initiates an analysing process by requesting the server to analyse the rule definitions relating the rule rendering element which has been triggered. The server then consults a rules engine at the server, the rules engine comprising sets of conditions and actions relating to the rules rendering element(s).

Based on the sets of conditions and actions available in the rules engine, and relating to the rule rendering element which has been triggered, the server generates rules code. The generated rules code is provided to the client.

Upon receipt of the rules code from the server, the client evaluates rules definitions related to the rules rendering element which has been triggered, and performs operation within the webpage, based on the evaluation.

Figure 5:
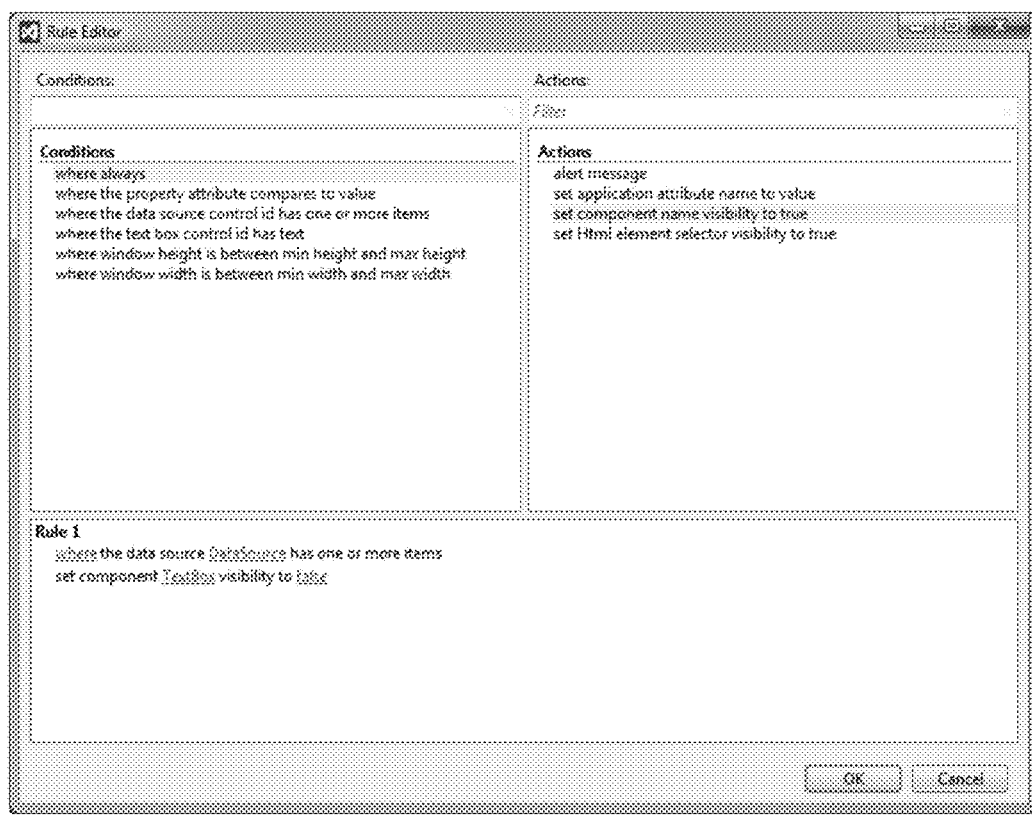
FIG. 5 is a screen dump illustrating a user interface for a rules engine for use in a method according to an embodiment of the invention.

FIG. 5 is a screen dump illustrating a user interface for a rules engine for use in a method according to an embodiment of the invention. The rules engine comprises a list of conditions, listed at the left hand side of the screen, and a list of actions, listed at the right hand side of the screen. The conditions and actions can be linked or combined to each other to define rules.

In the lower part of the screen, an example of a rule is shown. The rule combines the condition 'where the datasource control id has one or more items' with the action 'set component name visibility to true/false'. Furthermore, the underlined variables have been defined, so that 'control id' is selected to be 'Datasource', 'name' is selected to be 'TextBox', and the 'true/false' variable is selected as 'false'.

Thus, the rule shown in the lower part of the screen specifies that when the specified 'Datasource' has one or more items, the specified 'TextBox' shall be given a visibility which is false, i.e. the text box shall no longer be displayed to the visitor at the client.

The invention claimed is:

1. A method for performing operations within a webpage, the webpage residing on a server and being presented on a client, the method comprising the steps of:
   providing a main layout,
   providing at least one rendering element within the main layout, each rendering element being adapted to perform a function and/or an action, and at least one of the rendering element(s) being a rule rendering element, each rule rendering element including definitions of a rule relating to one or more functions and/or one or more actions of the webpage, including definition of a rule trigger,
   providing a rules engine comprising sets of conditions and actions relating to each of the rule rendering element(s),
   upon request from a client, providing the webpage, including the rendering element(s), from the server to the client,
   in the case that a rule trigger relating to at least one rule rendering element is detected, analysing the rule definitions of said rule rendering element, by means of the rules engine, and on the basis of the rule trigger and conditions defined in the rules engine, said analysis including evaluation of rule definitions of the rule rendering element, at least said evaluation taking place client-side, and
   the client performing one or more operations within the webpage on the basis of said evaluation,
   wherein the method further comprises the step of supplying the rules engine to the client along with the webpage and the rendering element(s).

2. The method according to claim 1, wherein the step of analysing the rule definitions comprises the steps of:
   based on the rule trigger, the client interpreting the rule definitions of the rule rendering element, based on the conditions defined in the rules engine, and
   the client evaluating the rule definitions of the rule rendering element, based on said interpretation, and based on the actions defined in the rules engine,
   and wherein the step of performing one or more operations within the webpage is performed on the basis of said evaluation.

3. The method according to claim 1, wherein the step of analysing the rule definitions comprises the steps of:
   based on the rule trigger, the client requesting the server to analyse the rule definitions of the rule rendering element, based on the conditions defined in the rules engine,
   the server generating rules code, based on the conditions defined in the rules engine, and returning said rules code to the client, and
   the client evaluating the rule definitions of the rule rendering element, based on the rules code received from the server, and based on the actions defined in the rules engine,
   and wherein the step of performing one or more operations within the webpage is performed on the basis of said evaluation.

4. The method according to claim 1, wherein the rule rendering element(s) is/are provided to a browser of the client in the form of JavaScript.

5. The method according to claim 1, wherein the step of providing a rules engine comprises defining sets of conditions and actions relating to each rule rendering element.

6. The method according to claim 1, further comprising the steps of:
   monitoring behaviour, at the client, of a visitor visiting the website,
   in the case that behaviour of the visitor constitutes a rule trigger relating to at least one rule rendering element, initiating analysis of the rule definitions of said rule rendering element, and
   dynamically performing one or more operations within the webpage, client-side, on the basis of said analysis.

7. The method according to claim 1, wherein the steps of analysing and performing one or more operations within the webpage are performed in real time.

8. The method according to claim 1, wherein at least one of the rendering elements defines interactive functionality allowing a visitor to the webpage to interact with the webpage, and wherein a rule trigger of at least one rule rendering element includes a predefined interaction performed by a visitor.

9. The method according to claim 1, wherein the step of performing one or more operations within the webpage comprises generating or updating the webpage.

10. The method according to claim 1, wherein the webpage is a dynamic webpage.

11. A method for performing operations within a webpage, the webpage residing on a server and being presented on a client, the method comprising the steps of:
   providing a main layout,
   providing at least one rendering element within the main layout, each rendering element being adapted to perform a function and/or an action, and at least one of the rendering element(s) being a rule rendering element, each rule rendering element including definitions of a rule relating to one or more functions and/or one or more actions of the webpage, including definition of a rule trigger,
   providing a rules engine comprising sets of conditions and actions relating to each of the rule rendering element(s),
   upon request from a client, providing the webpage, including the rendering element(s), from the server to the client,
   in the case that a rule trigger relating to at least one rule rendering element is detected, analysing the rule definitions of said rule rendering element, by means of the rules engine, and on the basis of the rule trigger and conditions defined in the rules engine, said analysis including evaluation of rule definitions of the rule rendering element, at least said evaluation taking place client-side, and the client performing one or more operations within the webpage on the basis of said evaluation, wherein the step of analysing the rule definitions comprises the steps of:

based on the rule trigger, the client requesting the server to analyse the rule definitions of the rule rendering element, based on the conditions defined in the rules engine, the server generating rules code, based on the conditions defined in the rules engine, and returning said rules code to the client, and the client evaluating the rule definitions of the rule rendering element, based on the rules code received from the server, and based on the actions defined in the rules engine, and wherein the step of performing one or more operations within the webpage is performed on the basis of said evaluation.

12. A method for performing operations within a webpage, the webpage residing on a server and being presented on a client, the method comprising the steps of:

providing a main layout, providing at least one rendering element within the main layout, each rendering element being adapted to perform a function and/or an action, and at least one of the rendering element(s) being a rule rendering element, each rule rendering element including definitions of a rule relating to one or more functions and/or one or more actions of the webpage, including definition of a rule trigger, providing a rules engine comprising sets of conditions and actions relating to each of the rule rendering element(s), upon request from a client, providing the webpage, including the rendering element(s), from the server to the client, in the case that a rule trigger relating to at least one rule rendering element is detected, analysing the rule definitions of said rule rendering element, by means of the rules engine, and on the basis of the rule trigger and conditions defined in the rules engine, said analysis including evaluation of rule definitions of the rule rendering element, at least said evaluation taking place client-side, and the client performing one or more operations within the webpage on the basis of said evaluation, wherein the step of providing a rules engine comprises defining sets of conditions and actions relating to each rule rendering element.

\* \* \* \* \*